US011799169B2

United States Patent
Zhang et al.

(10) Patent No.: US 11,799,169 B2
(45) Date of Patent: *Oct. 24, 2023

(54) MULTILAYER MICROPOROUS SEPARATORS FOR LITHIUM ION SECONDARY BATTERIES AND RELATED METHODS

(71) Applicant: CELGARD, LLC, Charlotte, NC (US)

(72) Inventors: Xiaomin Zhang, Charlotte, NC (US); Lie Shi, Matthews, NC (US); William John Paulus, Waxhaw, NC (US)

(73) Assignee: Celgard, LLC, Charlotte, NC (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/189,550

(22) Filed: Mar. 2, 2021

(65) Prior Publication Data

US 2021/0234236 A1     Jul. 29, 2021

Related U.S. Application Data

(62) Division of application No. 16/450,143, filed on Jun. 24, 2019, now Pat. No. 10,938,011, which is a
(Continued)

(51) Int. Cl.
*H01M 50/403* (2021.01)
*H01M 50/491* (2021.01)
(Continued)

(52) U.S. Cl.
CPC ....... *H01M 50/403* (2021.01); *H01M 50/417* (2021.01); *H01M 50/457* (2021.01);
(Continued)

(58) Field of Classification Search
CPC .................. H01M 50/449; H01M 50/403
See application file for complete search history.

(56) References Cited

U.S. PATENT DOCUMENTS

| 5,051,183 A | 9/1991 | Takita et al. |
| 5,453,333 A | 9/1995 | Takauchi et al. |

(Continued)

OTHER PUBLICATIONS

X.M. Zhang et al., "Oriented structure and anisotropy properties of polymer blown films: HOPE, LLOPE and LOPE," Polymer 45, Elsevier Ltd., (p. 217-229), 2004.
(Continued)

*Primary Examiner* — Sarah A. Slifka
(74) *Attorney, Agent, or Firm* — Hammer & Associates, P.C.

(57) ABSTRACT

An improved multilayer laminated microporous battery separator for a lithium ion secondary battery, and/or a method of making or using this separator is provided. The preferred inventive dry process separator is a tri-layer laminated Polypropylene/Polyethylene/Polypropylene microporous membrane with a thickness range of 12 μm to 30 μm having improved puncture strength and low electrical resistance for improved cycling and charge performance in a lithium ion battery. In addition, the preferred inventive separator's or membrane's low Electrical Resistance and high porosity provides superior charge rate performance in a lithium battery for high power applications.

20 Claims, 17 Drawing Sheets

Related U.S. Application Data division of application No. 14/950,625, filed on Nov. 24, 2015, now Pat. No. 10,333,125.

(60) Provisional application No. 62/084,655, filed on Nov. 26, 2014.

(51) Int. Cl.
*H01M 50/489* (2021.01)
*H01M 50/417* (2021.01)
*H01M 50/457* (2021.01)
*H01M 10/0525* (2010.01)

(52) U.S. Cl.
CPC ....... *H01M 50/489* (2021.01); *H01M 50/491* (2021.01); *H01M 10/0525* (2013.01); *H01M 2220/20* (2013.01); *Y02E 60/10* (2013.01)

(56) References Cited

U.S. PATENT DOCUMENTS

| | | |
|---|---|---|
| 6,096,213 A | 8/2000 | Radovanovic et al. |
| 6,153,133 A | 11/2000 | Kaimai et al. |
| 6,602,593 B1 | 8/2003 | Callahan et al. |
| 6,666,969 B1 | 12/2003 | Funaoka et al. |
| 8,486,556 B2 | 7/2013 | Call et al. |
| 8,795,565 B2 | 8/2014 | Wei et al. |
| 2001/0038942 A1 | 11/2001 | Fisher et al. |
| 2011/0064990 A1 | 3/2011 | Mohr et al. |
| 2011/0223486 A1 | 9/2011 | Zhang et al. |
| 2011/0236764 A1 | 9/2011 | Takita et al. |
| 2013/0337311 A1 | 12/2013 | Itou |

OTHER PUBLICATIONS

Seyed H. Tabatabaei et al., "Microporous membranes obtained from PP/HDPE multilayer films by stretching," JMS 345, Elsevier, (p. 148-159), 2009.

Cambridge Polymer Group, "The Theory of Birefringence," CPGAN #014, 2004.

MULTILAYER MICROPOROUS SEPARATORS FOR LITHIUM ION SECONDARY BATTERIES AND RELATED METHODS

CROSS-REFERENCE TO RELATED APPLICATIONS

This application is a Divisional Application of Ser. No. 16/450,143, filed Jun. 24, 2019, which claims priority to U.S. application Ser. No. 14/950,625, filed Nov. 24, 2015, now U.S. Pat. No. 10,333,125 on Jun. 25, 2019, which claims priority to U.S. Provisional Application No. 62/084,655, filed Nov. 26, 2014, which is incorporated herein by reference in its entirety.

FIELD OF THE INVENTION

In accordance with at least selected embodiments, the present invention or application is directed to novel or improved battery separators, base films or membranes, and/or methods of making and/or using such separators, films or membranes. In accordance with at least certain selected embodiments, the present invention or application is directed to novel or improved single or multilayer, co-extruded or laminated microporous battery separators for lithium-ion secondary batteries, and/or methods of making and/or using such separators. In accordance with at least particular embodiments, the invention is directed to novel or improved multilayer laminated microporous battery separators for lithium ion secondary batteries and/or methods of making and/or using this separator. The possibly preferred inventive dry process separator is a tri-layer laminated Polypropylene/Polyethylene/Polypropylene (PP/PE/PP) microporous membrane with a thickness range of 12 µm to 30 µm having improved puncture strength and low electrical resistance for improved cycling and charge performance in a lithium ion battery. In addition, the preferred inventive separator's or membrane's low Electrical Resistance and high porosity provides superior charge rate performance in a lithium battery for high power applications.

BACKGROUND OF THE INVENTION

Various methods exist to increase the mechanical strength of microporous separator membranes for lithium ion secondary batteries. One such method of improving the mechanical strength of a dry process microporous battery separator membrane is discussed in U.S. Pat. No. 6,602,593. This method is based on using a blow-up ratio (BUR) of at least 1.5 during blown film extrusion. As known to one skilled in the art, a blow-up ratio method involves a radial expansion of blown film from an annular die. An increased level of crystalline structure orientation in the transverse direction (TD) was achieved in the extruded membrane using a blow-up ratio equal to or greater than 1.5.

U.S. Pat. No. 8,795,565 describes a biaxial stretching technique involving both machine direction (MD) and TD stretching of a dry process precursor membrane with a controlled MD relax process step. Biaxial stretched membranes have improved mechanical strength in the machine direction (MD) and TD direction which may be predictive of excellent strength performance when used as a battery separator membrane in a lithium ion battery.

U.S. Pat. No. 8,486,556 discloses a multilayered battery separator with increased strength as defined by the Mixed Penetration strength test method which is a measure of the force required to create a short circuit through a separator membrane. A high molecular weight polypropylene resin with a melt flow index≤1.2 gram/10 minutes measured at the polypropylene layer in the PP/PE/PP trilayer configuration of the multilayer separator membrane was used to produce the multilayered separator with thicknesses ranging from 21 to 24.5 µm, a porosity ranging from 35% to 37%, an ASTM Gurley from 18 to 19 seconds (equivalent to a JIS Gurley=450 to 475 seconds), and Electrical Resistance (ER) (equivalent to the term Ionic Resistance, IR) ranging from 2.1 to 2.3 ohm-cm$^2$.

Also known are wet process microporous battery separators which are also typically biaxially stretched and may have fairly balanced MD and TD strength properties. Examples of microporous membranes produced using a wet process may be U.S. Pat. Nos. 5,051,183; 6,096,213; 6,153,133; and 6,666,969.

Wet process battery separator membranes are manufactured using very high molecular weights polymer resins which typically have a molecular weights greater than 500,000 and more preferably are greater than 1,000,000 and require the use of a plasticizer(s) to allow melt extrusion. In addition, a component know as a plasticizer(s), typically oils, must be used in order for the very high molecular weight resins to undergo melt extrusion. The plasticizer must be extracted using solvents as part of the manufacturing process. The oil-plasticizer contaminated solvent from the extraction step of the manufacturing process must be recycled in order to bring the extracted solvent and oil to usable purity quality. This is an additional energy cost that is expensive. Therefore, the wet process has the disadvantage of being a possibly environmentally challenged process with costly solvent handling and disposal issues when compared to the solvent-free, 'green', low impact, less expensive, dry process method.

The known methods of BUR blown film method, TD stretching of dry process membranes and the wet process biaxial stretched porous membranes have yet to achieve excellent strength performance properties in combination with a low Electrical Resistance (ER), not only <2 ohm-cm$^2$ ER range, but in the much lower and more preferred ER range of ≤1.3 ohm-cm$^2$.

Accordingly, there is a need for a dry process, solvent free, environmentally low impact process that produces a microporous battery separator or membrane with excellent cycle performance and safety in a lithium ion battery. Battery manufacturers in the high power applications, for example, the Electric Drive Vehicle (EDV) industry, desire or require microporous battery separators with thicknesses preferably ranging from 14 to 30 µm, microporosity, with a high charge rate (C-rate) for optimal high energy performance. Furthermore, there is a need for a dry process microporous battery separator or membrane that will meet these requirements for EDV and Hybrid Electric Vehicle (HEV) battery systems.

SUMMARY OF THE INVENTION

In accordance with at least selected embodiments, aspects or objects, the present invention addresses the above needs and/or is directed to novel or improved battery separators, base films or membranes, and/or methods of making and/or using such separators, films or membranes. In accordance with at least certain selected embodiments, aspects or objects, the present invention or application is directed to novel or improved single or multilayer, co-extruded or laminated microporous battery separators for lithium-ion secondary batteries, and/or methods of making and/or using such separators. In accordance with at least particular embodiments, the invention is directed to novel or improved multilayer laminated microporous battery separators for lithium batteries, secondary or rechargeable lithium batteries, lithium ion secondary batteries, and/or methods of making and/or using this separator. The possibly preferred inventive dry process separator is a tri-layer laminated Polypropylene/Polyethylene/Polypropylene (PP/PE/PP) microporous membrane with a thickness range of 14 μm to 30 μm having improved puncture strength and low electrical resistance for improved cycling and charge performance in a lithium battery. In addition, the preferred inventive separator's or membrane's low Electrical Resistance and high porosity provides superior charge rate (C rate) performance in a lithium battery for high power applications (such as EDV or HEV).

A novel microporous battery separator has been developed for use in a lithium ion rechargeable battery. The possibly preferred inventive separator membrane, separator, base film or membrane is a dry process multi-layer laminated microporous battery separator or membrane comprising a polypropylene/polyethylene/polypropylene (PP/PE/PP) trilayer configuration. The multilayer PP/PE/PP includes a thermal shutdown function provided by an inner PE layer. In addition, the outer PP layers provide excellent oxidation resistance for improved cycling and trickle charge performance. The preferred polypropylene layers are manufactured using a high molecular weight, low melt flow index polypropylene resin or a blend of high molecular weight, low melt flow index polypropylene resins which, when extruded, do not require the use of plasticizers, and produces a precursor membrane with an internal microstructure having a high level of crystalline lamellae orientation. This high level of crystalline lamellae orientation in the PP layer of precursor membrane may play a critical role in the improved mechanical strength performance of the inventive separator porous membrane. Furthermore, the degree of crystallinity in the lamellae structure may play an integral role in the formation of the micropores during the stretching step in the manufacturing process of microporous separator membranes, and has a major effect on the pore size and the percent porosity making up the overall microstructure of the porous layers in the PP/PE/PP separator or membrane.

The inventive multilayer separator, base film (adapted to be coated or laminated to other layers) or membrane can be prepared by the dry stretch process (the CELGARD® dry process) which generally comprises: extruding separately PP and PE nonporous precursors, bonding together the non-porous precursors in a PP/PE/PP stacked configuration to form a bonded non-porous PP/PE/PP precursor, and stretching to form a microporous multilayer membrane where pore formation results from stretching a nonporous, semi-crystalline, extruded polymer precursor in the machine (MD) direction.

The preferred inventive membrane with its combination of low ER, high porosity, low Gurley and high puncture strength has improved cycle life performance and/or a higher level of safety in a lithium or lithium ion rechargeable battery for use in high power end use applications.

The increased crystalline structure orientation in the transverse direction (TD) achieved by the radially expansion of a blown extruded precursor film has been found to improve the mechanical strength, specifically TD tensile strength and TD elongation resulting in less splitting of the stretched microporous membrane in the machine direction (MD).

The exemplary inventive multilayer membrane, with a preferred thickness range of about 12 to 30 μm, has high charge rate performance when compared to prior art battery separator membranes due to a combination of high porosity ≥38%, low electrical resistance ≤1.5 ohm-cm$^2$ and low JIS Gurley ≤320 sec/100 cc. Low ER and high porosity in a battery separator leads to a higher level of ionic conductivity of the electrolyte and/or promotes long cycle life in a lithium ion secondary battery.

In order to achieve low ER and high porosity, the inventive multilayer separator membrane is preferably manufactured using a high molecular weight, low melt flow index polypropylene polymer resin which, when melt extruded using a dry process without the use of solvents and an extraction step, produces a high level of crystalline lamellae content in the precursor membrane. When the precursor membrane having this high level of crystalline lamellae is stretched to make pores, the resulting microporous membrane exhibits increased puncture strength, low ER and high porosity. A separator should have significant mechanical strength to endure the rigors of cell assembly and charge and discharge cycles throughout the lifetime of a battery. The inventive separator preferably has a puncture strength ranging from 330 gf at a thickness of 14 μm up to 549 gf at a thickness of 30 μm. The inventive dry process microporous battery separator membrane preferably has equal or better separator performance properties between dry process and the wet process battery separator microporous membranes in terms of battery cycle life and safety performance in a Lithium ion secondary battery.

In the dry process, the mode of pore formation in the stretching step involves machine direction stretching which pulls apart stacked crystalline lamellae plates, extending polymer fibrils and forming rectangular shaped pores. The amount of crystallinity in the lamellae structure in the nonporous PP layer of the precursor membrane may be a key factor in the formation of internal porous microstructure of a dry process stretched microporous membrane. It is mentioned in X. M. Zhang, et. al., "Oriented Structure and Anisotropy Properties of Polymer Blown Films HDPE, LLDPE and LDPE", POLYMER 45 (2004) 217-229 and in S. Tabatabaei, et. al, "Microporous Membranes Obtained from PP/HDPE Multilayer Films by Stretching", JMS 345 (2009) 148-159 that the structure of the crystalline phase strongly influences the mechanical properties of films. When the inventive higher crystalline lamellae content precursor membrane is stretched to make pores, the resulting microporous membrane exhibits increased puncture strength, low ER together with a high level of porosity. Each of these factors contributes to the high level of performance of the separator membrane in terms of battery cycle life and safety in lithium ion secondary batteries.

DETAILED DESCRIPTION OF THE INVENTION

An exemplary novel or improved microporous battery separator has been developed for use in a lithium battery such as a lithium ion rechargeable battery. The possibly preferred inventive separator membrane is a dry process PP/PE/PP multi-layer microporous battery separator membrane manufactured using a high molecular weight and a low melt flow index polypropylene resin or a blend of high molecular weight and low melt flow index polypropylene resins (for at least the outer layers) which, when extruded (without the need for plasticizers which must be extracted later), produces a precursor membrane with an internal microstructure having a high level of crystalline lamellae orientation. In addition, the internal microstructure has a high level of uniformity of crystalline lamellae structures which influences the micropore formation in the stretching step in a dry process.

Figure 1A:
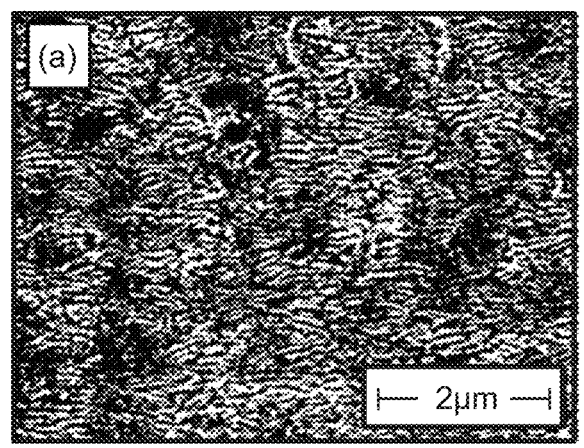
FIG. 1A is an SEM Micrograph Surface view of an Etched PP Membrane Showing Uniform and Ordered Stacked Lamellar Structure, and showing a scale of 2 μm.
Figure 1B:
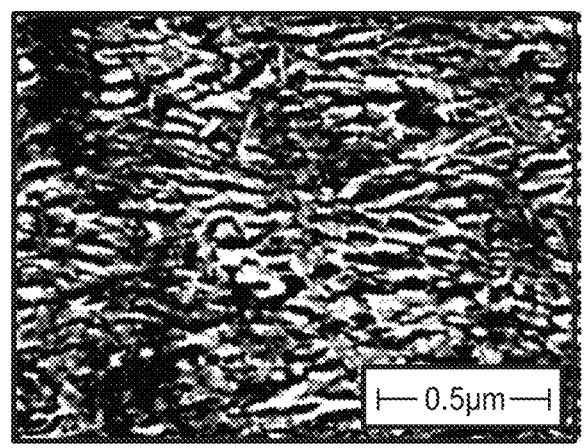
FIG. 1B is an SEM Micrograph Surface view of an Etched PP Membrane Showing Uniform and Ordered Stacked Lamellar Structure of the same sample as shown in FIG. 1A, and showing greater enlargement with a scale of 0.5 μm
Figure 2:
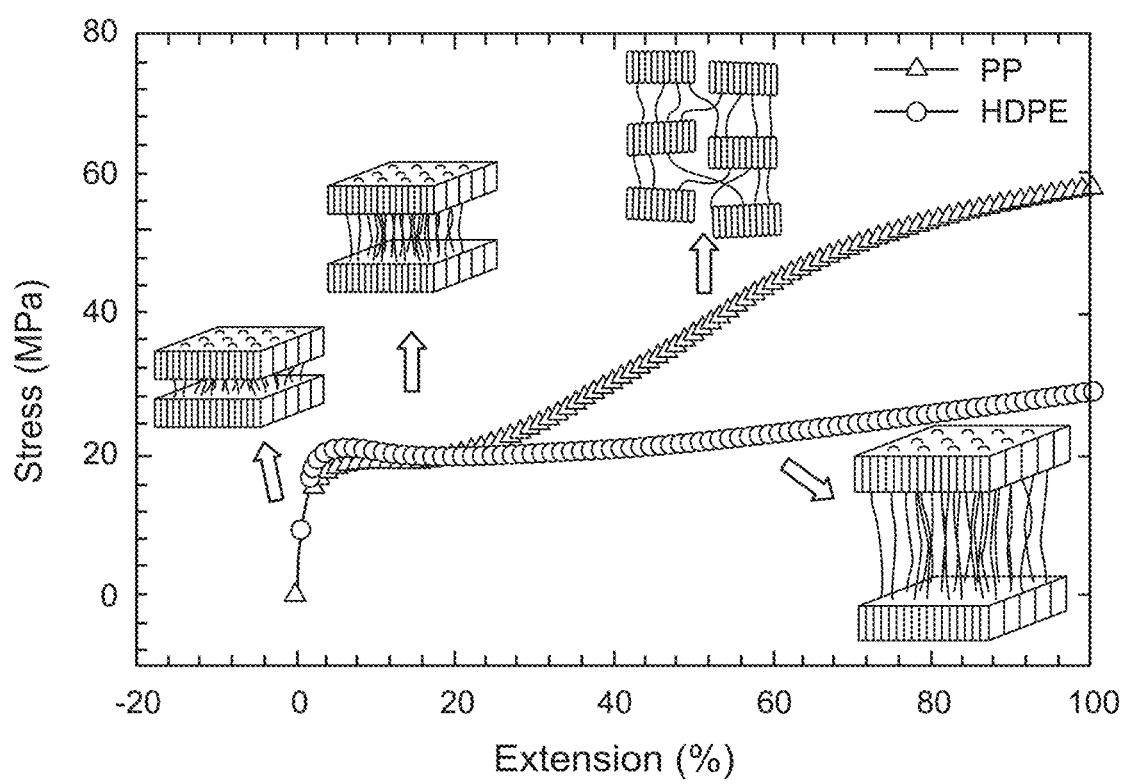
FIG. 2 is Stress Strain plot of PP and HDPE Membranes.
Figure 3:
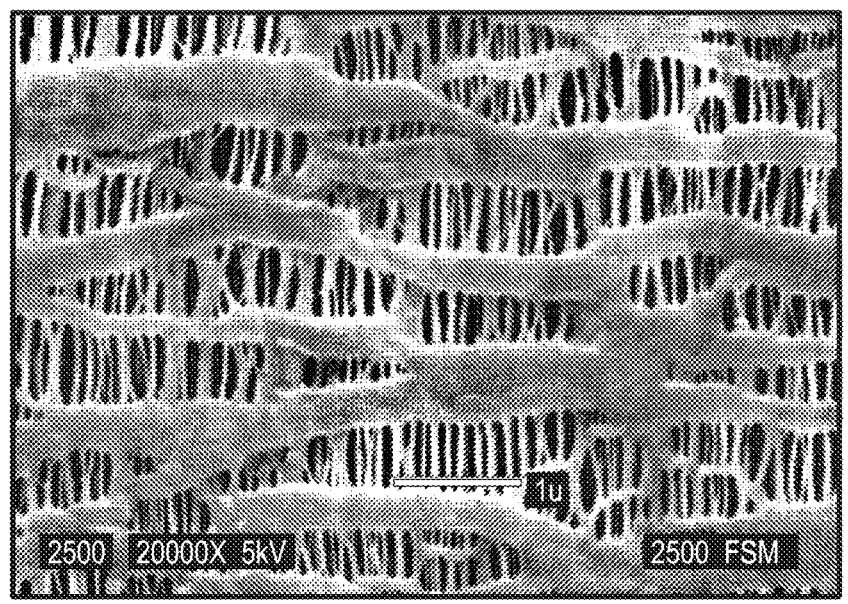
FIG. 3 is SEM Micrograph of the Surface of CE 6 Microporous Film at 20,000× Magnification.
Figure 4:
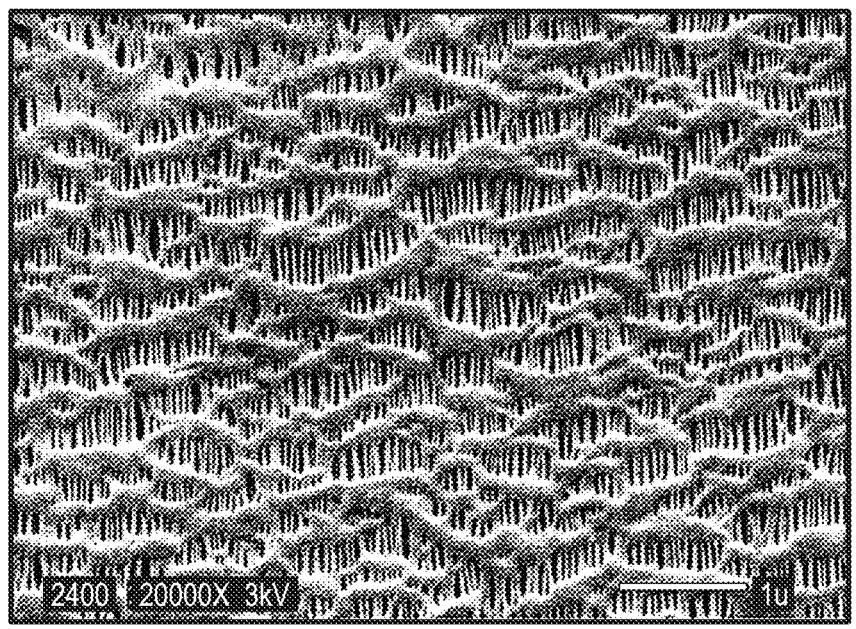
FIG. 4 is SEM Micrograph of the Surface of CE 5 Microporous Film at 20,000× Magnification.

FIGS. 1A and 1B are SEM micrographs of an etched PP nonporous membrane which has a uniform and orderly stacked crystalline lamellar structure which has not undergone MD or TD stretching. The etching process was performed in order to remove any amorphous portion to better allow visualization of the crystalline lamellae structure. A commonly known mode of pore formation in membranes is known and published in X. M. Zhang, et. al., "Oriented Structure and Anisotropy Properties of Polymer Blown Films HDPE, LLDPE and LDPE", POLYMER 45 (2004) 217-229 and in S. Tabatabaei, et. al, "Microporous Membranes Obtained from PP/HDPE Multilayer Films by Stretching", JMS 345 (2009) 148-159. FIG. 2 is a typical stress/strain plot showing the response of a nonporous membrane to applied stress where the pulling apart of the stacked crystalline lamellae plates with the initial application of stress is depicted. This initial separation of the lamellae plates is followed by the further pulling out of the polymer chains from the lamellar stack to form extended polymer chain structures known as fibrils. FIG. 2 depicts further extension of polymer fibrils with applied stress to create the porous regions in the microstructure, FIGS. 3 and 4 are SEM micrographs showing the microscale appearance of the surface of microporous separator membranes CE 6 and CE 5. The crystalline lamellae and fibrillar structure are clearly visible at a magnification of 20,000×. A comparison of the crystalline lamellae regions of CE 6 and CE 5 membranes demonstrates that CE 6 has thicker crystalline lamellae regions than CE 5.

Figure 5:
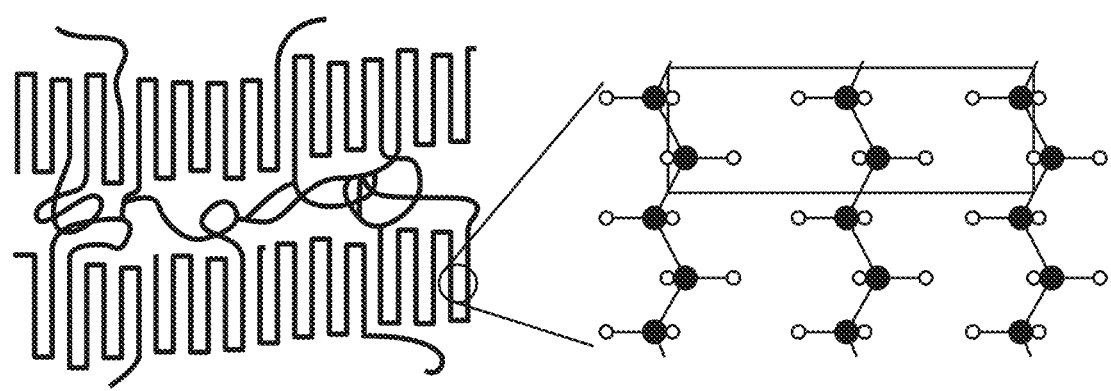
FIG. 5 is a schematic diagram of chain folding in polypropylene and the molecular level polymer structure in the folds (See "The Theory of Birefringence", Cambridge Polymer Group, 2004, CPGAN #014, www.campoly.com).

FIG. 5 depicts chain folding in a polypropylene crystalline lamellae together a representation of the molecular level of polypropylene polymer chains within the lamellae structure. (see "The Theory of Birefringence", Cambridge Polymer Group, 2004, CPGAN #014, www.campoly.com). Melt flow index (mfi or MFI), which is measured by weighing the mass of polypropylene polymer flow in a 10 minute time period under a weight of 2.16 kg at 230 deg C., is an inherent property of a polymeric resin which is used in a melt flow extrusion process and is related to the molecular weight of a resin. Higher molecular weight PP will have lower mfi values.

Table 1 lists the melt flow index values of CE 6 and CE 5 microporous membranes together with the pore size of the resulting microporous membrane produced from resins having the listed mfi values.

TABLE 1

| Resin and Membrane Properties. | | |
|---|---|---|
| ID | mfi | Pore size, μm |
| CE 6 | 5.0 | 0.064 |
| CE 5 | 1.5 | 0.04 |
| Ex. 1-Ex. 6 | 0.8 | 0.029-0.038 |

CE 6 and CE 5 are produced using polypropylene resins of different molecular weights and melt flow indices (mfi) which may be critical factors in the development of the crystalline lamellae regions formed during melt extrusion of the precursor membrane in a dry process.

CE 6 polypropylene resin has a mfi of 5.0 g/10 minutes which is more than a 3× higher melt flow index (mfi) than the resin used to manufacture CE 5 demonstrating a change in mfi value can have a significant effect on the development of crystalline lamellae regions and the uniformity of these crystalline lamellae regions in the microstructure of a porous separator membrane.

EXAMPLES

Table 2. lists separator performance properties of twelve inventive examples Ex. 1-Ex. 12 (and for four comparative examples CE 1 to CE 4). The thickness of the inventive examples range from 14 μm to 30 μm which is the preferred targeted thickness range for EDV application.

TABLE 2

| Separator Membrane Properties. | | | | | | |
|---|---|---|---|---|---|---|
| | Thickness μm | JIS Gurley sec/100 cc | ER ohm-cm² | % Porosity | PP Pore Size, μm | PS, gf |
| Ex. 1 | 14.4 | 320 | 1.2 | 39% | 0.029 | 330 |
| Ex. 2 | 17.3 | 290 | 1.2 | 41% | 0.031 | 350 |
| Ex. 3 | 20 | 250 | 1.0 | 48% | 0.038 | 400 |
| Ex. 4 | 20 | 320 | 1.3 | 47% | 0.032 | 450 |
| Ex. 5 | 25 | 320 | 1.2 | 50% | 0.035 | 450 |
| Ex. 6 | 30 | 350 | 1.4 | 53% | 0.036 | 549 |
| Ex. 7 | 12 | 230 | 1.1 | 42% | 0.034 | 280 |
| Ex. 8 | 14 | 210 | 1.0 | 44% | 0.039 | 300 |
| Ex. 9 | 16 | 250 | 0.9 | 50% | 0.036 | 350 |
| Ex. 10 | 18 | 250 | 1.1 | 44% | 0.040 | 380 |
| Ex. 11 | 18 | 190 | 0.9 | 48.5% | 0.048 | 360 |

TABLE 2-continued

Separator Membrane Properties.

| | Thickness µm | JIS Gurley sec/100 cc | ER ohm-cm$^2$ | % Porosity | PP Pore Size, µm | PS, gf |
|---|---|---|---|---|---|---|
| Ex. 12 | 25 | 250 | 1.0 | 53% | 0.045 | 420 |
| CE 1 | 16.7 | 316 | 1.5 | 41% | 0.030 | 325 |
| CE 2 | 25 | 620 | 2.5 | 39% | 0.028 | 380 |
| CE 3 | 20 | 530 | 1.4 | 39% | 0.027 | 360 |
| CE 4 | 16 | 460 | 2.0 | 35% | 0.032 | 250 |

Figure 6:
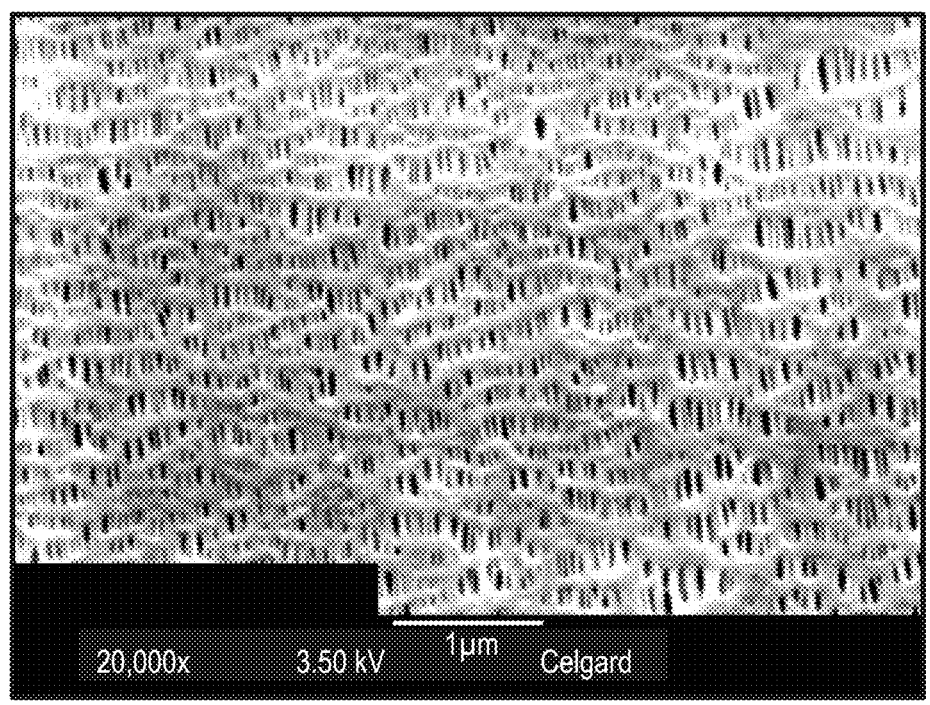
FIG. 6 is SEM Micrograph of the Surface of inventive Ex. 2 Membrane.
Figure 7:
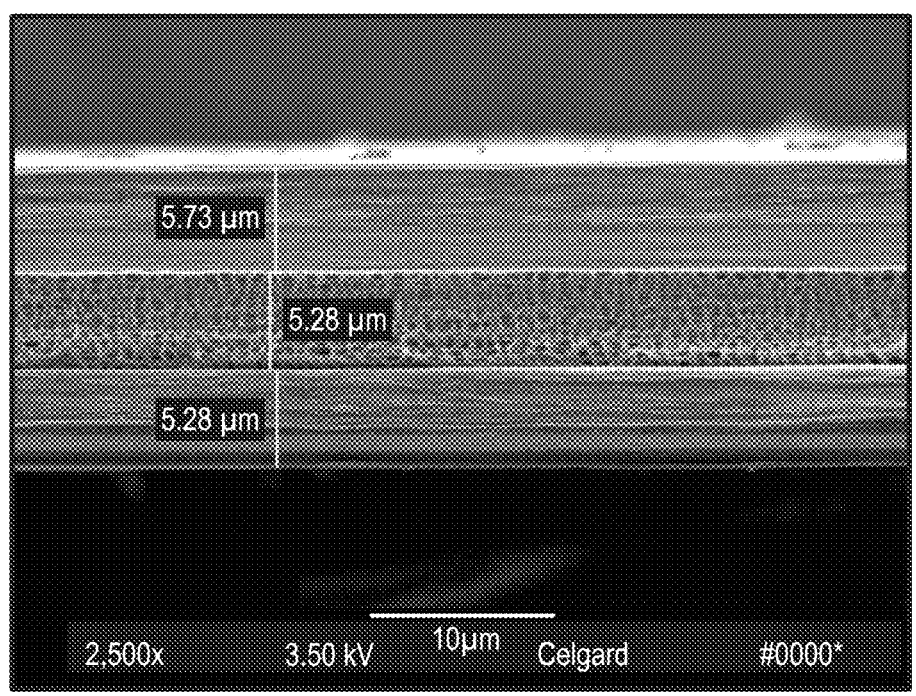
FIG. 7 is SEM Micrograph of Cross Section View of Ex. 2 Membrane.

The inventive separator membranes are produced using a high molecular weight polypropylene resin. When this higher crystalline resin is melt extruded, the resulting nonporous precursor membrane has a high level of crystalline lamellae orientation. Annealing and stretching of the higher molecular weight nonporous precursor membrane produces microporous membranes with improved puncture strength at higher porosities and lower ER. An SEM micrograph of the PP surface of Inventive Ex. 2 shown in FIG. 6 indicates a higher level crystalline lamellae content as noted by the thicker lamellae regions as compared to FIG. 3 (CE 6) and FIG. 4 (CE 5). Thicker lamellae may produce a mechanically stronger microporous membrane.

Figure 8:
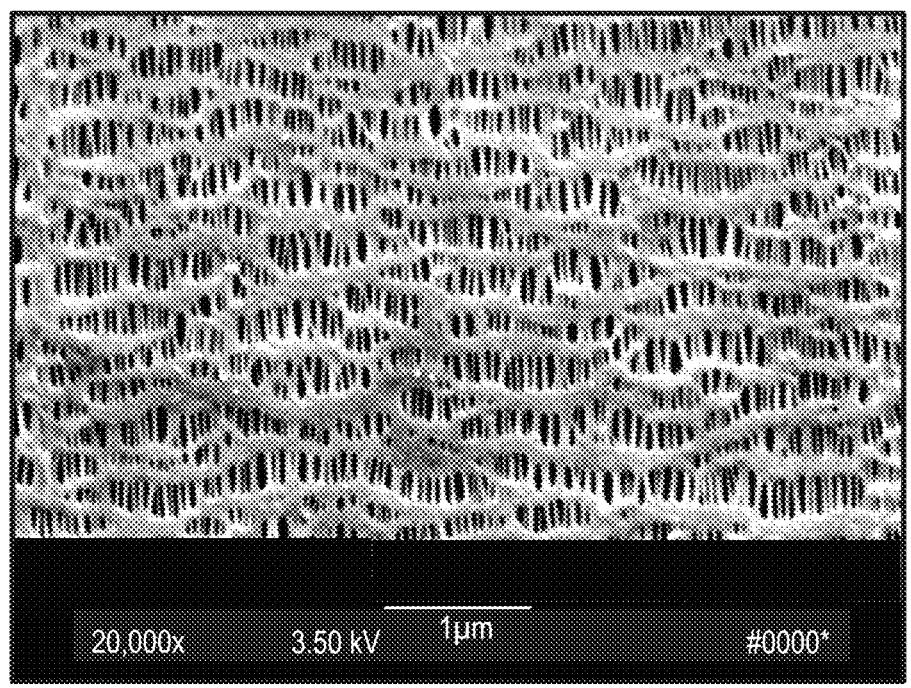
FIG. 8 is SEM Micrograph of the Surface of Ex. 3 Membrane.
Figure 9:
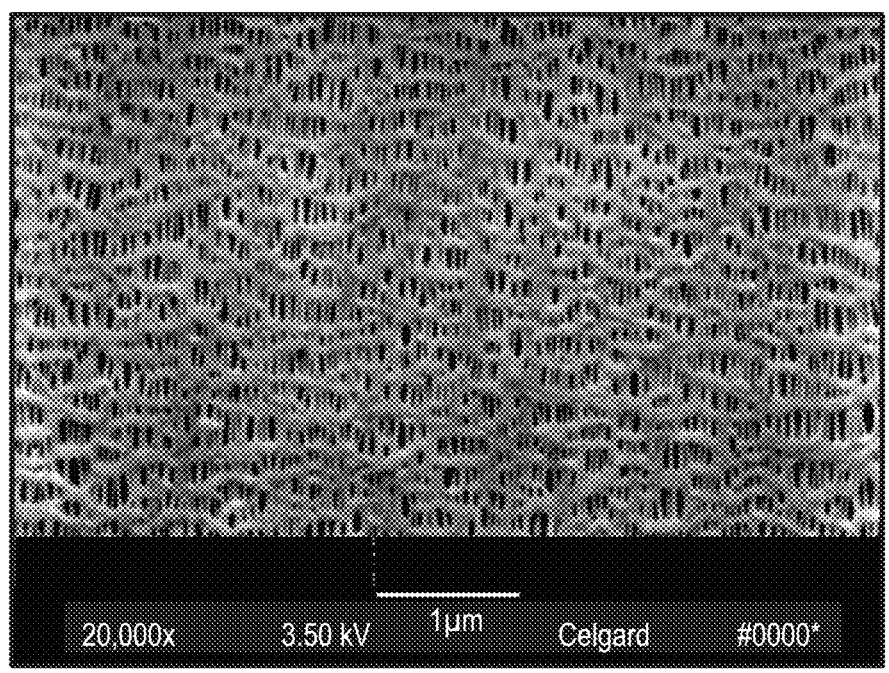
FIG. 9 is SEM Micrograph of the Surface of Ex. 4 Membrane.
Figure 10:
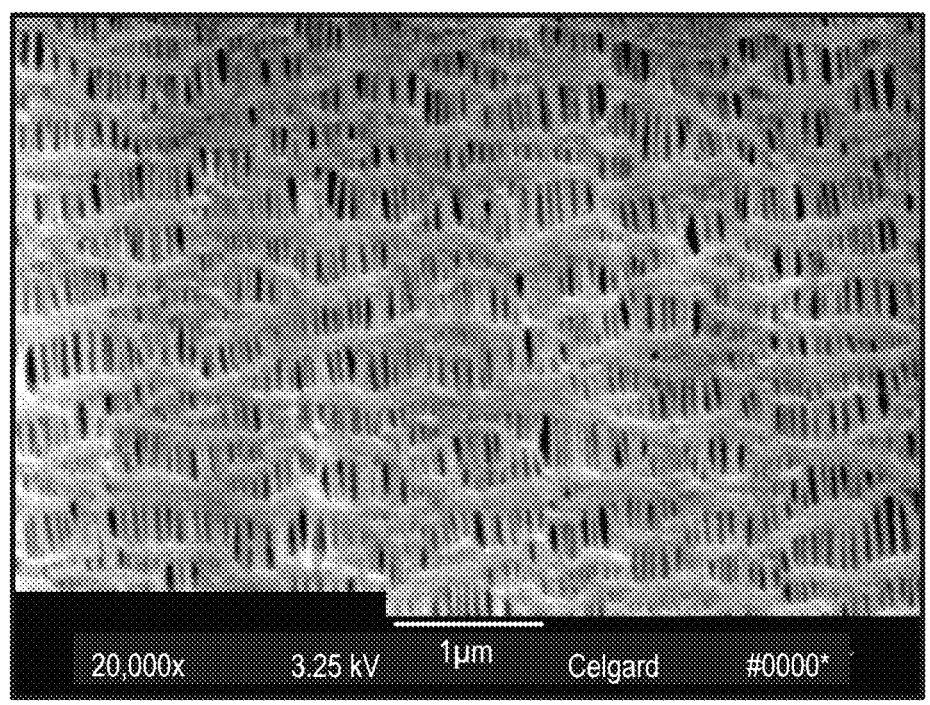
FIG. 10 is SEM Micrograph of the Surface of Ex. 5 Membrane.
Figure 11:
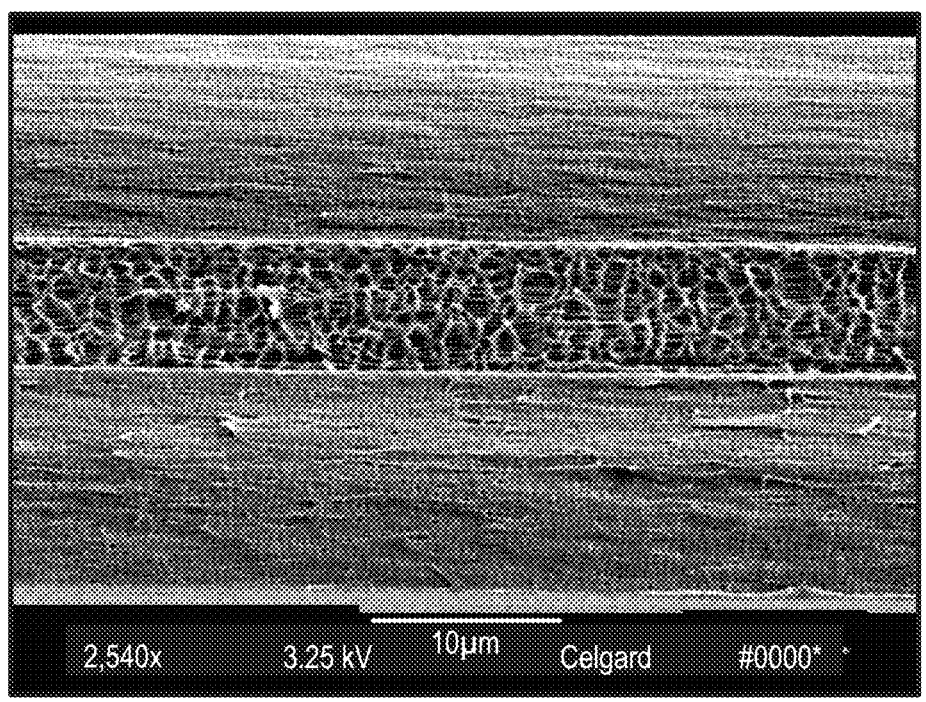
FIG. 11 is SEM of Cross Section View of Ex. 5 Membrane.
Figure 12:
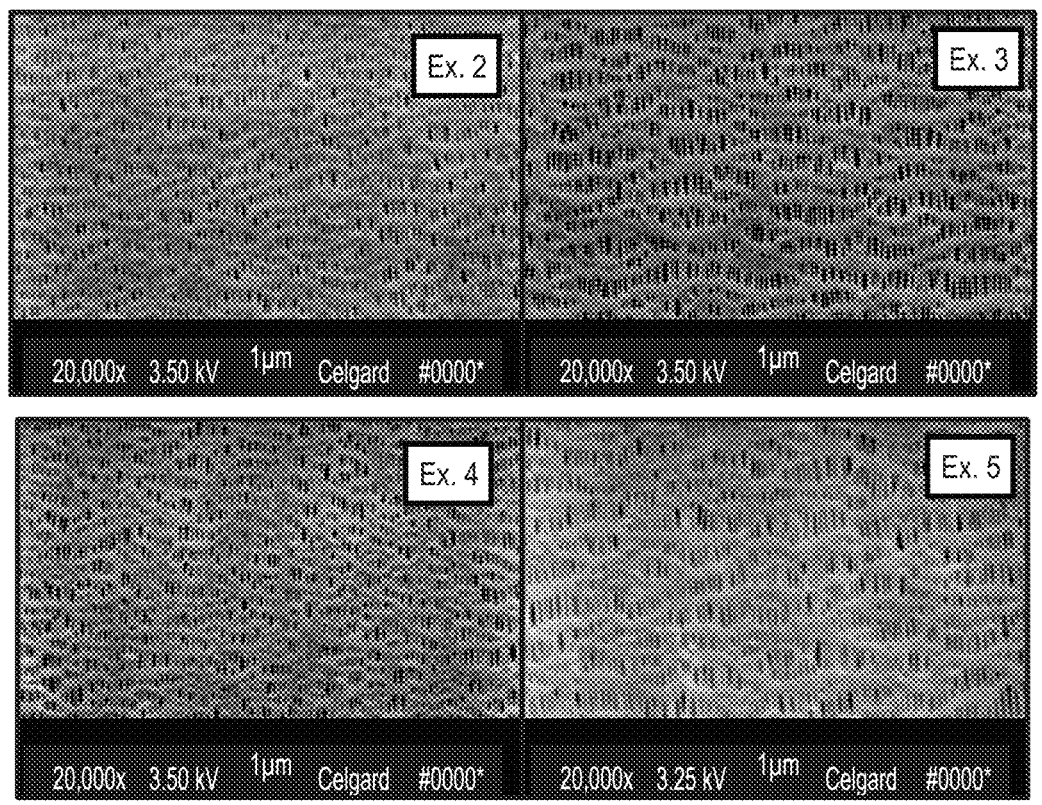
FIG. 12 is Side by Side Comparison of Surface SEM Micrographs of Inventive Ex. 2, 3, 4 and 5 Membranes.
Figure 13:
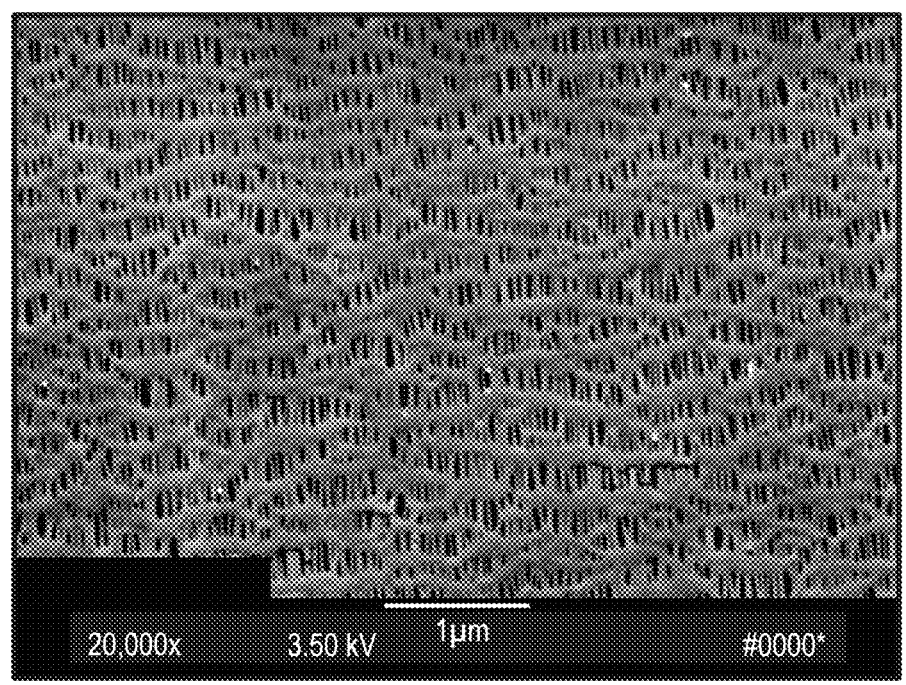
FIG. 13 is SEM Surface Micrograph of CE 1.

SEM micrographs of Ex. 3, Ex. 4 and Ex. 5 are shown in FIGS. 8, 9 and 10. The inventive examples described herein are thermal shutdown microporous membranes which contain a PE layer. FIG. 11 is a SEM micrograph of a cross sectional view showing the trilayer PP/PE/PP construction of Inventive Ex. 2 where the thickness of each PP and PE layer are labeled in microns. The inner PE layer, which provides thermal shutdown at approximately 135 deg C., typically has larger pores than the outer PP layers. FIG. 12 provides a side by side comparison of SEM micrographs of the surface of the Inventive examples Ex. 2, Ex. 3, Ex. 4, and Ex. 5 demonstrating the higher content of crystalline content in the internal microstructure of the membranes. The higher level of crystalline lamellae and uniformity of crystalline lamellae of the inventive examples is demonstrated in the SEM micrographs in FIG. 12. FIG. 13 is an SEM micrograph of the surface of the Comparative Example 1 which has less uniform crystalline lamellae.

The amount and uniformity of crystalline lamellae in the inventive nonporous precursor membranes, together with the pore size and % porosity of the microporous separator membrane, may play a critical role in separator performance properties such as Electrical Resistance, Gurley, and Puncture strength. Inventive membranes Ex. 1 through Ex. 12 have Electrical Resistance (ER) values ranging from 0.9 to 1.4 at thicknesses ranging from 12 to 30 µm which provide high performance microporous membrane for EDV applications. The preferred inventive microporous membranes have low ER and low Gurley which are important in achieving excellent high rate performance in lithium batteries for EDV and other power applications when compared to prior art battery separator membranes.

Figure 14:
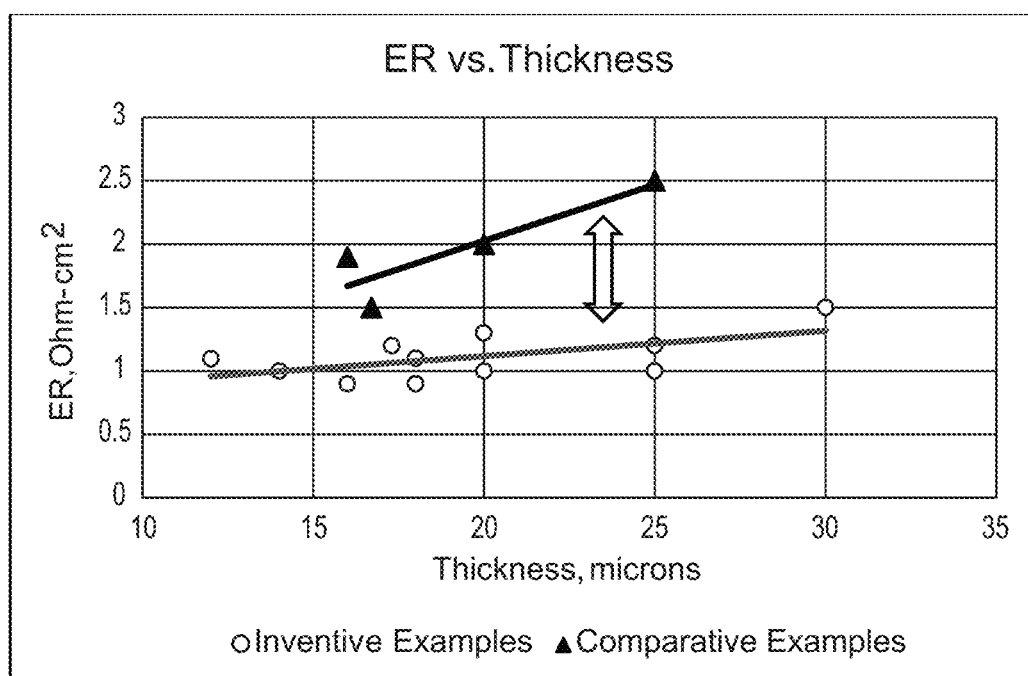
FIG. 14 is Electrical Resistance vs Thickness Plot.

FIG. 14 is a plot of ER in ohm-cm$^2$ as a function of membrane thickness in µm of the inventive membranes Ex. 1 through Ex 12. The inventive examples have significantly lower ER than the comparative examples CE 1, 2, 3 and 4. Furthermore, as the thickness of the inventive examples increases from 12 to 30 µm, the ER remains low at ≤1.5 ohm-cm$^2$. A low ER separator membrane provides improved level of conductivity of the lithium ions during charge and discharge cycling in a lithium ion battery adding to the overall performance of a battery.

Figure 15:
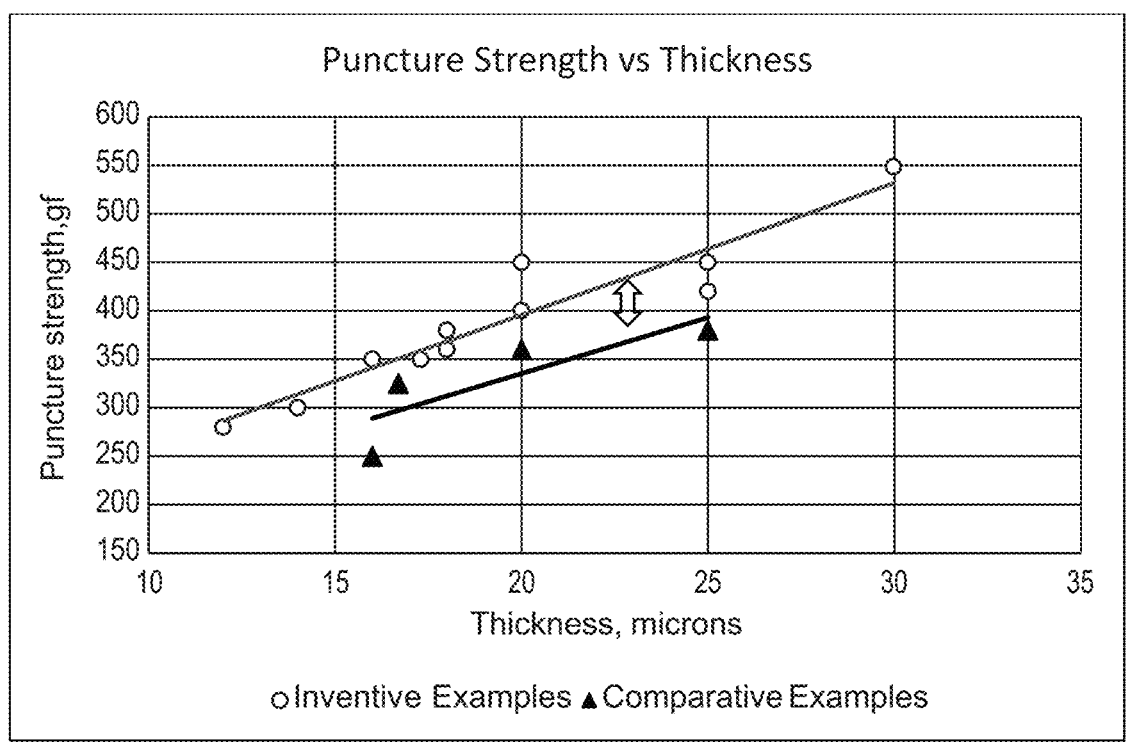
FIG. 15 is Puncture Strength vs. Thickness Plot.

FIG. 15 is a plot of Puncture strength as a function of thickness for the inventive separator membrane Ex. 1 through Ex. 12. The inventive membranes have higher puncture strength than the comparative examples CE 1 through CE 4. Ex. 7, which is only 12 µm in thickness, has higher puncture strength than CE 4, which is 16 µm thick. The inventive membrane may better withstand the rigors of the winding process of the battery assembly which may translate into improved mechanical strength protection against dendrite penetration during battery cycling. Across the 12 µm to 30 µm range of thickness, the inventive membranes shown in FIG. 15 outperform the comparative art in terms of higher puncture strength.

Figure 16:
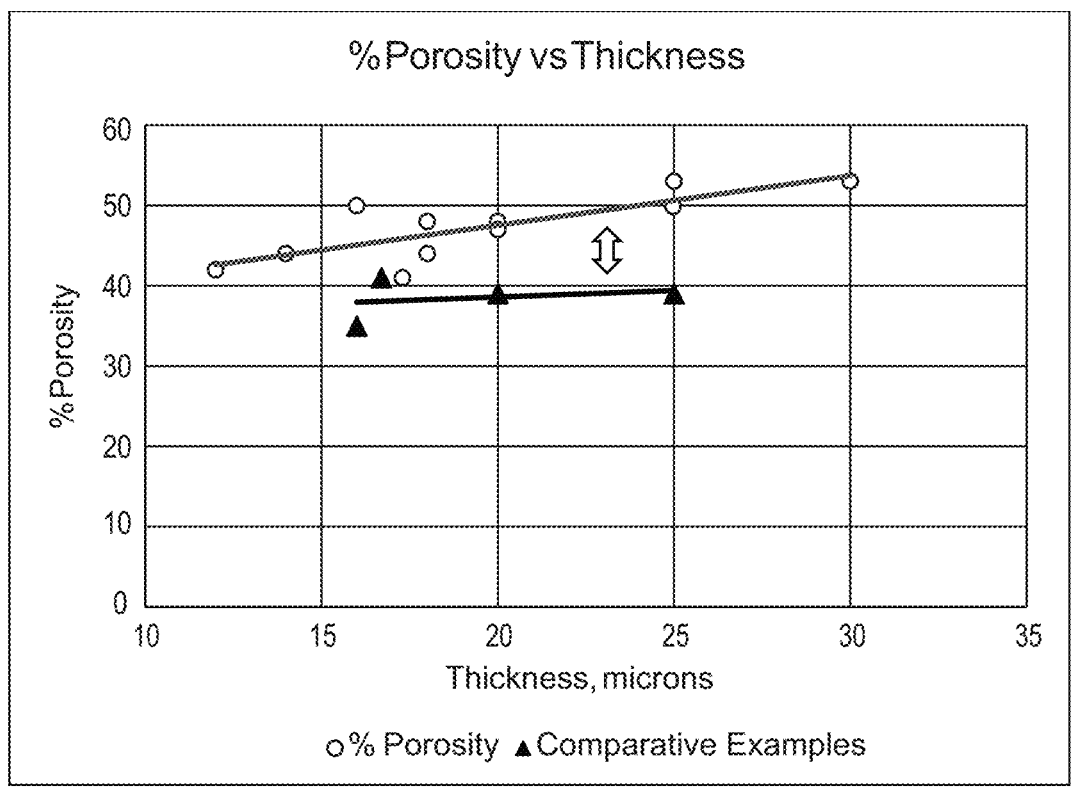
FIG. 16 is % Porosity vs. Thickness Plot.

FIG. 16 is a plot of % porosity as a function of thickness of Inventive membranes Ex. 1 through Ex. 12. The inventive membranes as compared to the comparative examples CE 1 through CE 4 have higher percent porosity across the 12 to 30 µm range of thickness and will perform better in a lithium ion battery in terms of which electrolyte conductivity and electrolyte retention.

Higher puncture strength, high percent porosity and low ER contribute to better cycle life and/or safety performance in a lithium ion battery, especially in high power applications.

In accordance with at least selected embodiments, aspects or objects, the present invention or application is directed to: An improved separator, membrane or base film as shown or described herein, and/or wherein the separator is a multi-layer separator, membrane or base film, wherein the separator is a trilayer separator, membrane or base film, wherein the separator is made by a dry stretch process, wherein the separator is made by a lamination process, wherein the separator has a puncture strength (PS) of at least 330 gf and has a thickness of at least 14 µm, wherein the separator has a puncture strength (PS) of at least 280 gf and has a thickness of at least 12 µm, wherein the separator has a puncture strength (PS) of at least 350 gf and has a thickness of at least 16 µm, wherein the separator has a porosity of at least 35%, wherein the separator has a porosity of greater than 37%, wherein the separator has a porosity of at least 39%, wherein the separator has a porosity in the range of about 35% to 65%, wherein the separator has a porosity in the range of about 39% to 53%, wherein the separator is especially well suited for power cells, such as used in electric vehicles, wherein the separator has an ER of 1.5 ohm-cm$^2$ or less, has a porosity of at least 35%, and is adapted for a high C rate charge and discharge, wherein the separator includes at least one microporous polyolefin membrane produced according to a dry process in which a polypropylene resin is extruded to form said membrane, said resin having a melt flow index (MFI) of less than or equal to about 0.8 grams/10 minute, and/or the like.

In accordance with at least selected embodiments, aspects or objects, the present invention or application is directed to: An improved multilayer separator, membrane or base film comprising:

at least one microporous membrane produced according to a dry stretch process in which a polyolefin resin, mix or blend is extruded to form said membrane, said resin having a melt flow index (MFI) of less than or equal to about 0.8 grams/10 minute; and wherein said separator having a thickness of greater than or equal to about 14 µm, a porosity in the range of about 35% to about 65%, and an electrical resistance (ER) value of less than or equal to about 1.5 ohm-cm$^2$, and optionally wherein the separator is a trilayer separator or base film, is made by a dry stretch process, is made by a lamination process, has a puncture strength (PS) of at least 280 gf and has a thickness of at least 12 µm, has a puncture strength (PS) of at least 330 gf and has a thickness of at least 14 µm, has a puncture strength (PS) of at least 350 gf and has a thickness of at least 16 µm, has a porosity of at least 35%, has a porosity of greater than 37%, has a porosity of at least 39%, has a porosity in the range of about 35% to 65%, has a porosity in the range of about 39% to 53%, is especially well suited for power cells, such as used in electric vehicles, has an ER of 1.5 ohm-cm' or less, has a porosity of at least 35%, and is adapted for a high C rate charge and discharge, includes at least two microporous polyolefin membranes produced according to a dry process in which a polypropylene resin is extruded to form said membrane, said resin having a melt flow index (MFI) of less than or equal to about 0.8 grams/10 minute, includes at least three microporous polyolefin membranes produced according to a dry process in which a polypropylene resin is extruded to form said membrane, said resin having a melt flow index (MFI) of less than or equal to about 0.8 grams/10 minute, includes at least one polyethylene membrane, includes at least two polypropylene membranes, and/or having an improved puncture strength over prior separators of the same thickness, and/or the like.

In accordance with at least selected embodiments, aspects or objects, the present invention or application is directed to: A multilayer separator as shown or described herein having an improved puncture strength over prior multilayer separators of the same thickness.

In accordance with at least selected embodiments, aspects or objects, the present invention or application is directed to: A trilayer separator as shown or described herein having an improved puncture strength over prior trilayer separators of the same thickness.

In accordance with at least selected embodiments, aspects or objects, the present invention or application is directed to novel or improved battery separators, base films or membranes, and/or methods of making and/or using such separators, films or membranes. In accordance with at least certain selected embodiments, aspects or objects, the present invention or application is directed to novel or improved single or multilayer, co-extruded or laminated microporous battery separators for lithium-ion secondary batteries, and/or methods of making and/or using such separators. In accordance with at least particular embodiments, the invention is directed to novel or improved multilayer laminated microporous battery separators for lithium ion secondary batteries and/or methods of making and/or using this separator. The possibly preferred inventive dry process separator is a tri-layer laminated Polypropylene/Polyethylene/Polypropylene (PP/PE/PP) microporous membrane with a thickness range of 14 µm to 30 µm having improved puncture strength and low electrical resistance for improved cycling and charge performance in a lithium ion battery. In addition, the preferred inventive separator's or membrane's low Electrical Resistance and high porosity provides superior charge rate performance in a lithium battery for high power applications.

An improved multilayer laminated microporous battery separator for a lithium ion secondary battery, and/or a method of making or using this separator is provided. The preferred inventive dry process separator is a tri-layer laminated Polypropylene/Polyethylene/Polypropylene microporous membrane with a thickness range of 14 µm to 30 µm having improved puncture strength and low electrical resistance for improved cycling and charge performance in a lithium ion battery. In addition, the preferred inventive separator's or membrane's low Electrical Resistance and high porosity provides superior charge rate performance in a lithium battery for high power applications.

Test Methods

Thickness

Thickness is measured using the Emveco Microgage 210-A precision micrometer thickness tester according to test procedure ASTM D374. Thickness values are reported in units of micrometers, µm.

Puncture Strength

Test samples are first pre-conditioned to 73.4 deg C. and a relative humidity of 50% for a minimum of 20 minutes. An Instron Model 4442 is used to measure puncture strength of test sample. Thirty measurements are made across the diagonal direction of a 1¼"×40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

Pore Size

Pore size is measured using the Aquapore available through Porous Materials, Inc. (PMI). Pore size is expressed in µm.

Porosity

The porosity of a microporous film sample is measured using ASTM method D-2873 and is defined as the percent void spaces in a microporous membrane.

TD and MD Tensile Strength

The tensile strength along the MD and TD is measured using Instron Model 4201 according to ASTM D-882 method.

Melt Flow Index (mfi)

Melt flow index of a polymer resin is measured using ASTM DS 1238; For measuring MFI of Polyethylene: Temperature=190° C. using weight 2.16 kg; for Polypropylene: Temperature=230° C. using weight 2.16 kg. MFI is measured as grams/10 minutes.

Electrical Resistance (ER) (Also Known as Ionic Resistance, IR)

Electrical Resistance is defined as the Resistance value in ohm-cm$^2$ of a separator filled with electrolyte. The units of electrical resistance are ohm-cm$^2$. The separator resistance is characterized by cutting small pieces of separators from the finished material and then placing them between two blocking electrodes. The separators are saturated with the battery electrolyte with 1.0 M LiPF$_6$ salt in EC/EMC solvent of 3:7 ratio by volume. The Resistance, R, in Ohms (Ω), of the separator is measured by a 4-probe AC impedance technique. In order to reduce the measurement error on the electrode/separator interface, multiple measurements are needed by adding more layers. Based on the multiple layer measurements, the electric (ionic) resistance, $R_s$ (Ω), of the separator saturated with electrolyte is then calculated by the formula $R_s = p_s l/A$ where $p_s$ is the ionic resistivity of the separator in Ω-cm, A is the electrode area in cm$^2$ and l is the thickness of the separator in cm. The ratio $p_s/A$=is the slope calculated for the variation of the separator resistance (ΔR) with multiple layers (Δδ) which is given by slope=$p_s/A$=ΔR/Δδ.

In accordance with at least selected embodiments, aspects or objects, a novel or improved multilayer laminated microporous battery separator for a lithium ion secondary battery, and/or a method of making and/or using this separator is provided. The preferred inventive dry process separator is a tri-layer laminated Polypropylene/Polyethylene/Polypropylene microporous membrane with a thickness range of 14 μm to 30 μm having improved puncture strength and low electrical resistance for improved cycling and trickle charge or charge performance in a lithium ion battery. In addition, the preferred inventive separator's or membrane's low Electrical Resistance and high porosity provides superior charge rate performance in a lithium battery for high power, EDV or HEV applications.

The present invention may be embodied in other forms without departing from the spirit and the essential attributes thereof, and, accordingly, reference should be made to the appended claims, rather than to the foregoing specification, as indicating the scope of the invention. Additionally, the invention disclosed herein suitably may be practiced in the absence of any element which is not specifically disclosed herein.

We claim:

1. A multilayer microporous dry-process battery separator comprising at least one layer that comprises polypropylene (PP) having a melt flow index (MFI) of less than or equal to about 0.8 grams/10 minute, and a pore size from 0.029 to 0.048 microns, and an ER value less than 1.5 ohm-cm$^2$.

2. The battery separator of claim 1, wherein the battery separator exhibits both a puncture greater than 280 gf.

3. The battery separator of claim 1, wherein the battery separator has a thickness of 12 microns and exhibits a puncture of at least 280 gf.

4. The battery separator of claim 1, wherein the battery separator has a thickness of 14 microns to 18 microns and exhibits a puncture of at least 330 gf.

5. The battery separator of claim 1, wherein the battery separator has a thickness of 16 microns to 18 microns and exhibits a puncture strength of at least 350 gf.

6. The battery separator of claim 1, wherein the battery separator has a thickness of 18 microns and exhibits a puncture strength of at least 360 gf.

7. The battery separator of claim 1, wherein the battery separator has a porosity in the range of 35% to 65%.

8. The battery separator of claim 1, wherein the battery separator comprises at least one additional layer that comprises polypropylene (PP) having a melt flow index (MFI) of less than or equal to about 0.8 grams/10 minute.

9. The battery separator of claim 1, wherein the battery separator is coated.

10. A power cell comprising the separator of claim 1.

11. A multilayer microporous dry-process battery separator comprising at least one layer that comprises polypropylene (PP) having a melt flow index (MFI) of less than or equal to about 0.8 grams/10 minute, and a pore size from 0.029 to 0.048 microns, and exhibits at least one of a puncture greater than 360 gf or an ER value less than 1.5 ohm-cm$^2$.

12. The battery separator of claim 11, wherein the battery separator exhibits both a puncture greater than 360 gf and an ER value less than 1.5 ohm-cm$^2$.

13. The battery separator of claim 11, wherein the battery separator has a thickness of 20 microns to 30 microns, and exhibits a puncture strength of at least 400 gf.

14. The battery separator of claim 11, wherein the battery separator has a thickness of 25 microns to 30 microns, and exhibits a puncture strength of at least 450 gf.

15. The battery separator of claim 11, wherein the battery separator has a thickness of 30 microns, and exhibits a puncture strength of at least 549 gf.

16. The battery separator of claim 11, wherein the separator has a porosity in the range of 35% to 65%.

17. The battery separator of claim 11, wherein the battery separator comprises at least one additional layer that comprises polypropylene (PP) having a melt flow index (MFI) of less than or equal to about 0.8 grams/10 minute.

18. The battery separator of claim 11, wherein the battery separator is coated.

19. A power cell comprising the separator of claim 11.

20. A multilayer microporous dry-process battery separator comprising at least one layer that comprises polypropylene (PP) having a melt flow index (MFI) of less than or equal to about 0.8 grams/10 minute and a pore size from 0.029 to 0.048 microns and at least one layer that comprises polyethylene, wherein the battery separator a thickness from 12 to 30 microns, and exhibits a puncture greater than 280 gf and an ER value less than 1.5 ohm-cm$^2$.

* * * * *